C. H. WITTHOEFFT.
MOLD FOR MAKING HOLLOW CONCRETE COLUMNS.
APPLICATION FILED NOV. 17, 1910.
1,013,251. Patented Jan. 2, 1912.
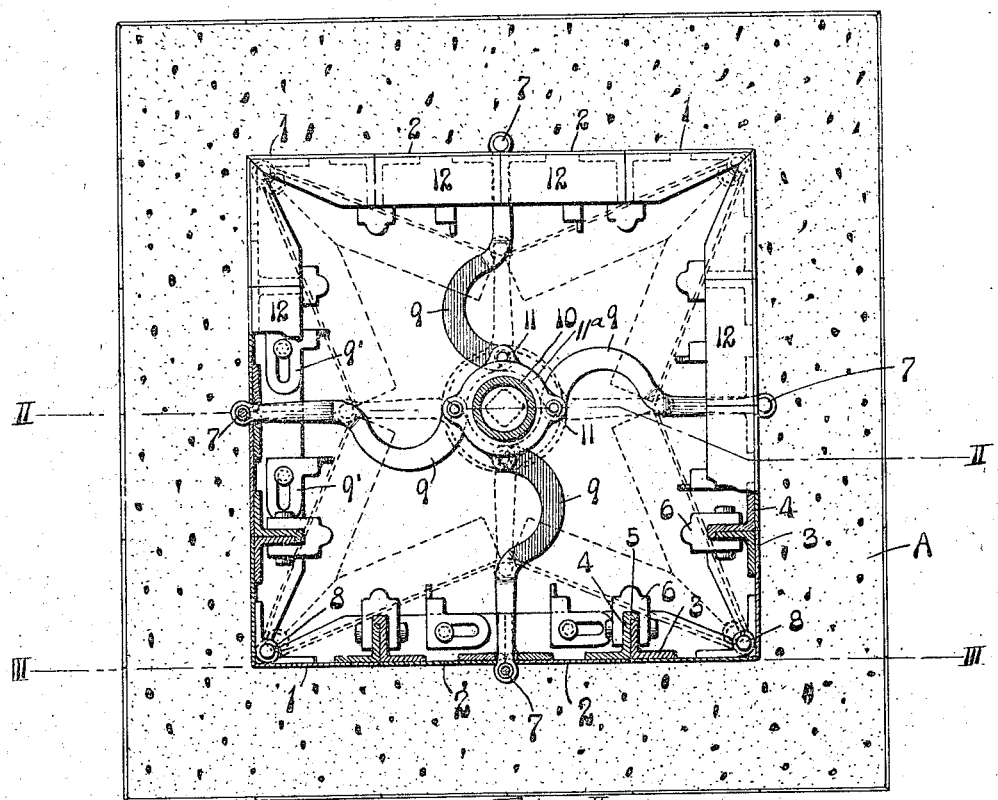
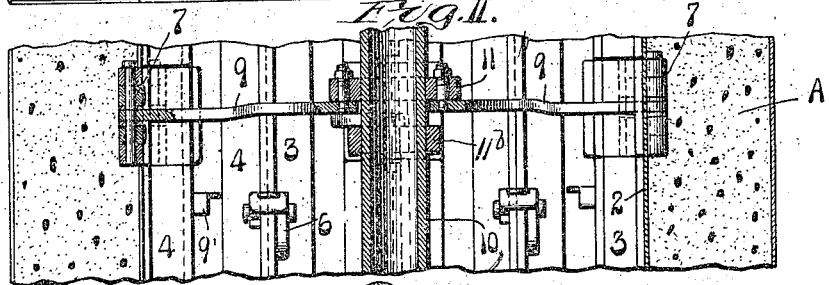
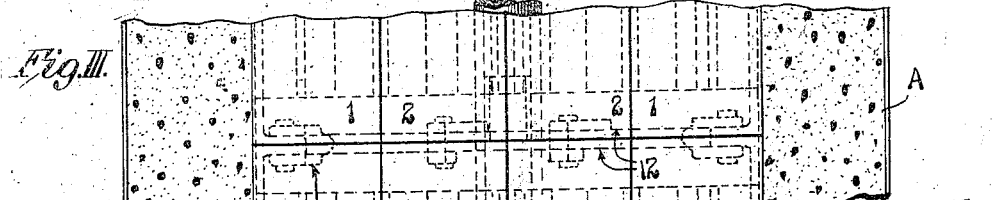

\# UNITED STATES PATENT OFFICE.

CHARLES H. WITTHOEFFT, OF ST. LOUIS, MISSOURI, ASSIGNOR TO WITTHOEFFT COLLAPSIBLE CONCRETE FORMS COMPANY, OF ST. LOUIS, MISSOURI, A CORPORATION OF MISSOURI.

MOLD FOR MAKING HOLLOW CONCRETE COLUMNS.

1,013,251. Specification of Letters Patent. Patented Jan. 2, 1912.

Application filed November 17, 1910. Serial No. 592,790.

*To all whom it may concern:*

Be it known that I, CHARLES H. WITTHOEFFT, a citizen of the United States of America, residing in the city of St. Louis and State of Missouri, have invented certain new and useful Improvements in Molds for Making Hollow Concrete Columns, of which the following is a full, clear, and exact description, reference being had to the accompanying drawings, forming part of this specification.

My invention relates to a mold for use in making hollow concrete columns, such for instance as chimneys, and it has for its object the production of a mold device of this description capable of employment at what is to be the interior of the column and collapsible to permit of the ready removal of the device after the column has been molded.

Figure I is a view in part plan and in part a horizontal section of my column mold and a molded column. Fig. II is a vertical section on line II—II, Fig. I. Fig. III is a vertical section on line III—III, Fig. I.

In the accompanying drawings: A designates a hollow concrete column, such as may be produced in the use of my molding device. In making such a column, any suitable molding device, or devices, may be employed as the outer walls of the mold, my invention pertaining to an inside mold device.

Each wall of my mold device comprises outer side mold plates 1 and intermediate side mold plates 2 located between the outer side mold plates. Each outer side mold plate is connected to the adjacent intermediate side mold plate with the object of providing for movement of the plates in pairs, the connections comprising angle bars 3 and 4 attached to said plates. The bars 3 and 4 extend longitudinally of the side mold plates at their adjacent edges and the wings of the bars 4 are provided at their edges with flanges 5 that project across the edges of the wings of the bars 3.

6 are clips straddling the wings of the bars 3 and 4, and preferably having slot and pin attachment to one of each pair of bars, permitting movement of the clips for separation of the bars.

The intermediate side mold plates of each mold wall are connected by hinges 7, and the outer side mold plates of each wall are connected to the side mold plates of the adjoining walls by corner hinges 8.

The parts described make up a continuous mold wall, and when they are assembled and held in their proper relative positions, by means about to be described, concrete is molded between such wall parts and an outer mold device that may be of any ordinary description.

9 designates side mold plate section holding and operating arms corresponding in number to the number of intermediate hinges 7. These arms are pivotally connected to the intermediate side mold plates 2, preferably by attachment to the pintles of the hinges 7, as seen in Figs. I and II.

10 is an operating shaft centrally located in the mold and adapted to be rotated by any suitable means. The shaft 10 is provided with an upper collar 11$^a$ having ears 11 to which the inner ends of the arms 9 are pivoted, and with a lower collar 11$^b$ on which the inner ends of the arms 9 are supported and it will be seen that upon rotation of said shaft, the arms may be moved outwardly or inwardly relative to the shaft to adjust the mold plates into positions for service and collapse the mold when it is to be withdrawn from a molded column. Rotating the shaft 10 to collapse the mold will cause all of the hinges 7 and 8 to move simultaneously toward the center of the mold, with the result of positively freeing all of the mold plates from the concrete, as shown in Fig. I. While all of the hinges move simultaneously in collapsing the mold, it will be understood that the intermediate hinges 7 move considerably faster than the corner hinges and the result of such movement is that the mold plates are gradually peeled from the hardened concrete.

My inside mold device is made in sections of such lengths that they may be readily handled in placing them in service and removing them from a molded column. To provide for the mounting of the sections one on another, the mold plates of the sections have secured to them at their lower and upper ends transverse bars 12 of angle shape having horizontal wings. The wings of the bars 12 at the foot of a surmounting mold section rest upon the wings of the bars 12 of a lower and intermediately adjoining section, and the wings of such sections are held in assemblage by clips 9′ applied to them as seen in full lines, Fig. I and dotted lines Fig. III.

I claim:

In a mold of the character described, mold plates hinged to each other at the corners of the mold, intermediate hinges connecting the mold plates at points between the corners of the mold, said intermediate hinges being provided with pintles, operating arms pivoted to the pintles of said intermediate hinges, and means for actuating said arms to simultaneously pull all of said pintles toward the center of the mold, thereby causing all of the mold plates to swing on their hinges toward the center of the mold and simultaneously shifting the corner hinges toward the center of the mold.

CHAS. H. WITTHOEFFT.

In the presence of—
A. J. McCauley,
E. B. Linn.